(12) United States Patent
Fleckenstein

(10) Patent No.: US 10,469,118 B2
(45) Date of Patent: Nov. 5, 2019

(54) MOBILE DEVICE ACCESSORY

(71) Applicant: Martin Fleckenstein, Edgewater, MD (US)

(72) Inventor: Martin Fleckenstein, Edgewater, MD (US)

(*) Notice: Subject to any disclaimer, the term of this patent is extended or adjusted under 35 U.S.C. 154(b) by 0 days.

(21) Appl. No.: 15/620,667

(22) Filed: Jun. 12, 2017

(65) Prior Publication Data
US 2017/0359095 A1  Dec. 14, 2017

Related U.S. Application Data

(60) Provisional application No. 62/348,221, filed on Jun. 10, 2016, provisional application No. 62/348,224, filed on Jun. 10, 2016.

(51) Int. Cl.
| | |
|---|---|
| *H04B 1/3888* | (2015.01) |
| *F16B 1/00* | (2006.01) |
| *F16M 13/06* | (2006.01) |
| *F16B 47/00* | (2006.01) |
| *F16M 13/02* | (2006.01) |
| *F16M 11/24* | (2006.01) |
| *F16M 11/04* | (2006.01) |
| *F16M 11/14* | (2006.01) |
| *F16M 13/00* | (2006.01) |
| *F16C 11/04* | (2006.01) |
| *F16C 11/06* | (2006.01) |
| *H04B 1/3877* | (2015.01) |

(52) U.S. Cl.
CPC ............. *H04B 1/3888* (2013.01); *F16B 1/00* (2013.01); *F16B 47/00* (2013.01); *F16B 47/006* (2013.01); *F16C 11/045* (2013.01); *F16C 11/06* (2013.01); *F16M 11/041* (2013.01); *F16M 11/14* (2013.01); *F16M 11/24* (2013.01); *F16M 13/00* (2013.01); *F16M 13/022* (2013.01); *F16M 13/06* (2013.01); *H04B 1/3877* (2013.01); *F16B 2001/0035* (2013.01)

(58) Field of Classification Search
CPC ...... F16M 11/24; F16M 13/022; F16M 13/06; H04B 1/3888; H04B 1/3822; F16B 1/00; F16B 47/00; F16B 2001/0035; F16B 47/006; F16B 21/07
USPC ........................................ 248/126
See application file for complete search history.

(56) References Cited

U.S. PATENT DOCUMENTS

| | | |
|---|---|---|
| 6,377,686 B1 | 4/2002 | Snyder |
| 6,662,986 B2 | 12/2003 | Lehtonen |

(Continued)

*Primary Examiner* — Christopher Garft
(74) *Attorney, Agent, or Firm* — 24IP Law Group USA, PLLC; Timothy R DeWitt

(57) ABSTRACT

A mobile device accessory assembly having a plurality of mobile device accessories. The assembly has a body member having a durable shell member having a shape to accommodate a mobile device, a recess for receiving a metal piece, a circular central accessory opening with a lip around a portion of the circumference of the central accessory opening, a lower accessory opening, and a hinge structure at an edge of the lower accessory opening and a metal piece secured in the recess in the durable shell. A holding accessory is rotatably secured in the circular central accessory opening in the durable shell. A hanging accessory is secured by a magnet to the metal piece in the recess in the durable shell. A standing accessory having a hinge member secured to the hinge member in the lower accessory opening in the durable shell.

14 Claims, 26 Drawing Sheets

(56) References Cited

U.S. PATENT DOCUMENTS

| | | |
|---|---|---|
| 8,579,112 B2 | 11/2013 | Bethea |
| 8,746,448 B1 | 6/2014 | Bellace |
| 9,065,890 B2 | 6/2015 | Filippov |
| 9,226,567 B2 | 1/2016 | Potter et al. |
| 2013/0181584 A1* | 7/2013 | Whitten ................ G06F 1/1656 312/223.1 |
| 2013/0240380 A1 | 9/2013 | Hansen |
| 2014/0217135 A1 | 8/2014 | Murphy et al. |
| 2014/0221055 A1 | 8/2014 | Wu |
| 2014/0364176 A1 | 12/2014 | Pintor |
| 2015/0365125 A1 | 12/2015 | Murphy et al. |
| 2016/0286920 A1* | 10/2016 | Lean ...................... A45C 11/00 |
| 2016/0347257 A1* | 12/2016 | Buchanan ............... B60R 11/02 |
| 2017/0033824 A1* | 2/2017 | Tien ..................... H04B 1/3888 |

\* cited by examiner

FIG. 1H
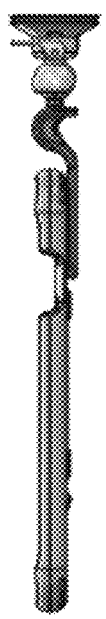 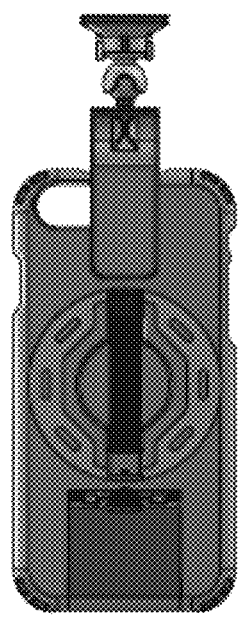  
FIG. 1F    FIG. 1D    FIG. 1E    FIG. 1C
FIG. 1G

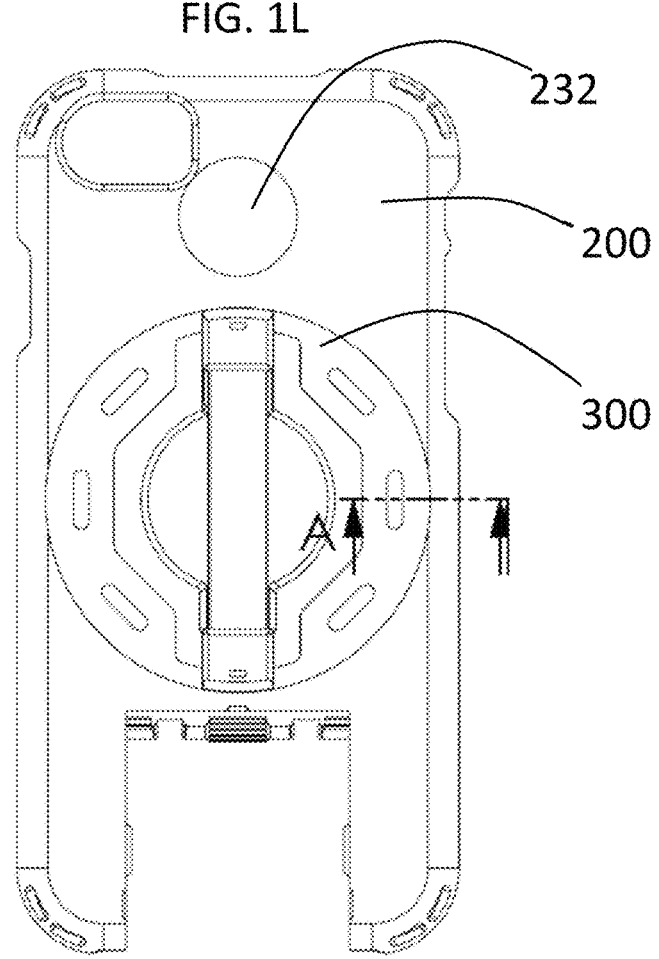
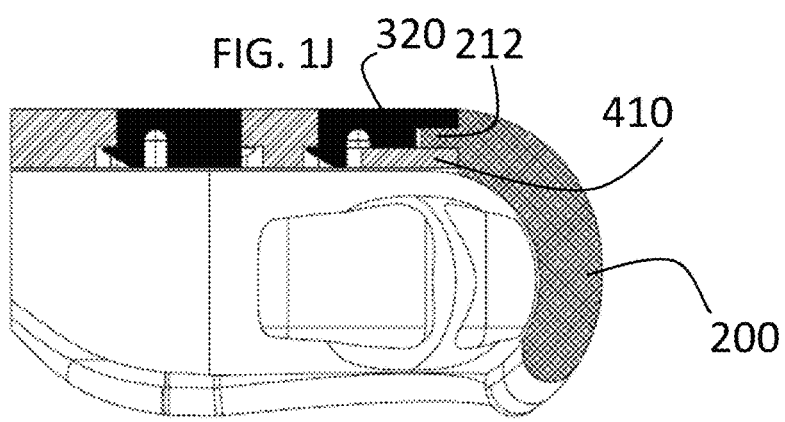
FIG. 1L
FIG. 1K
FIG. 1J
SECTION A-A
FIG. 1M

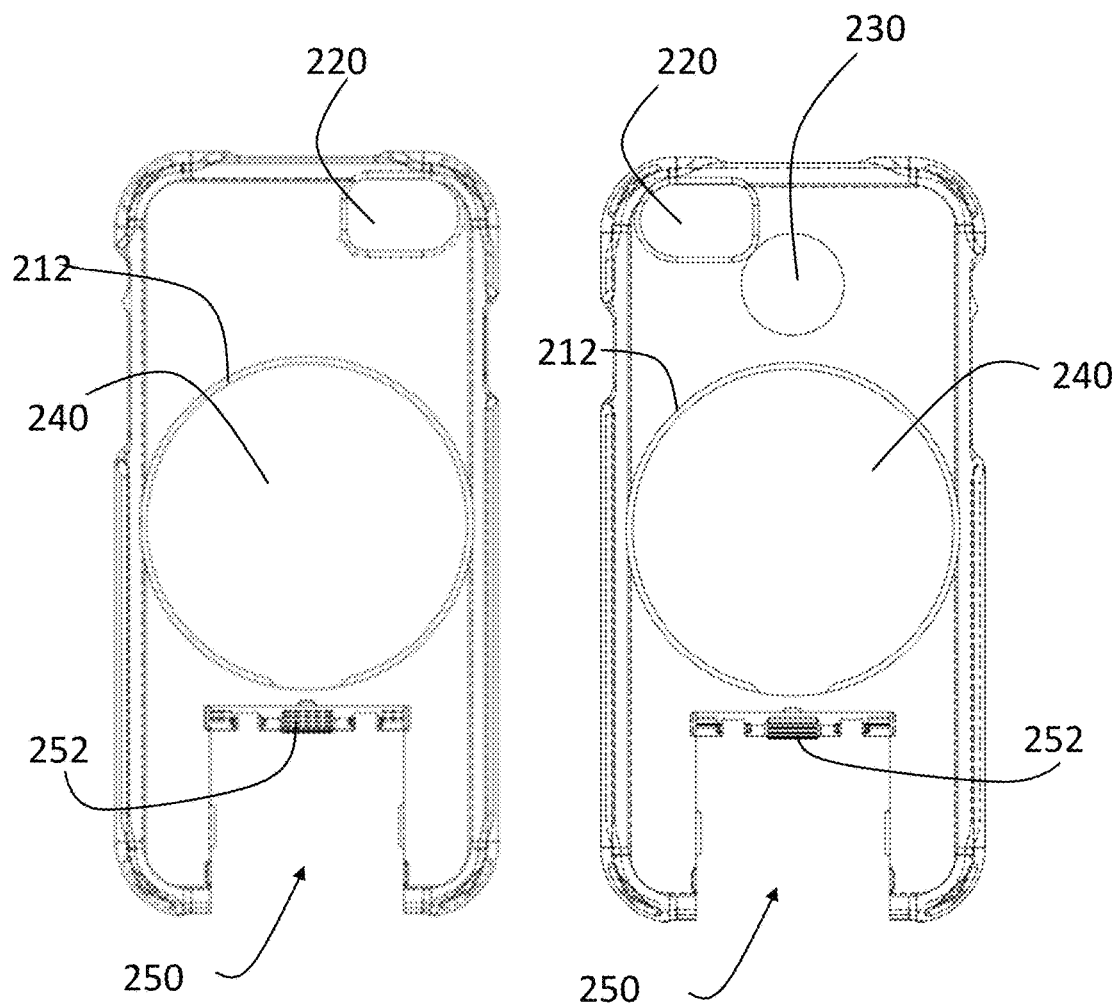

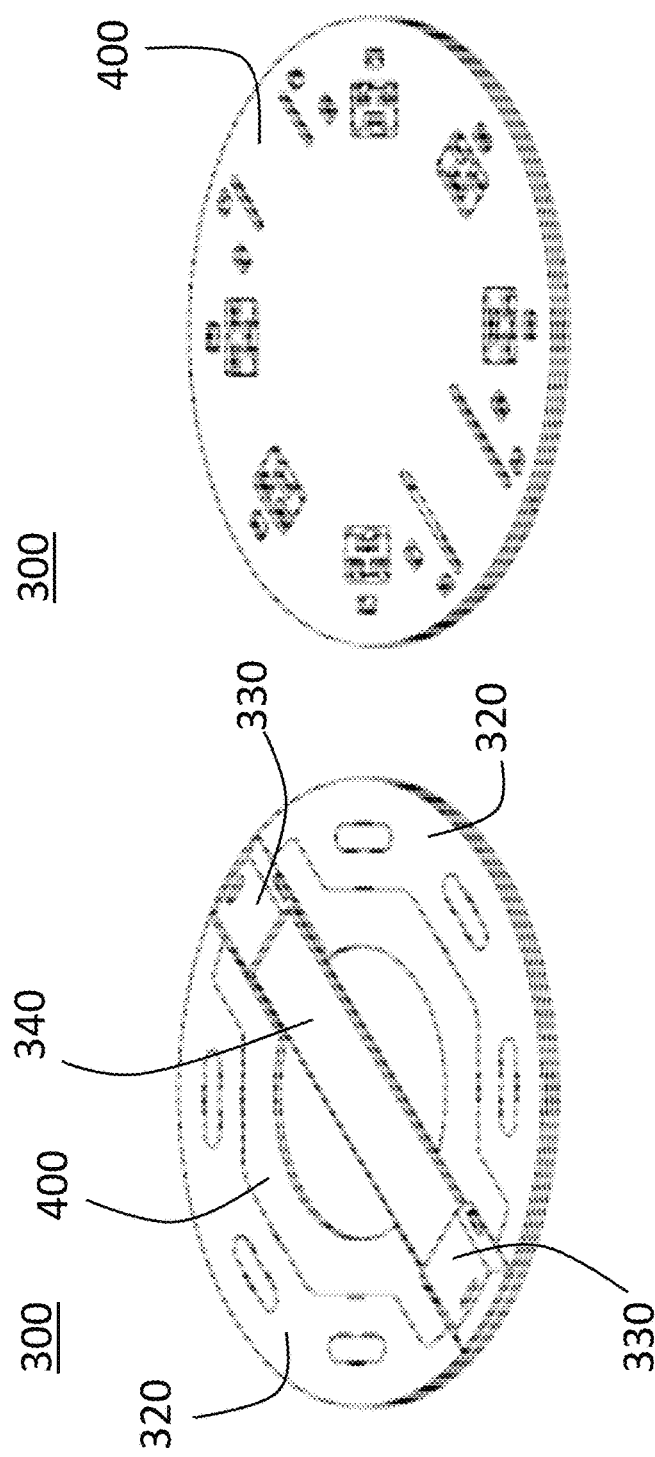

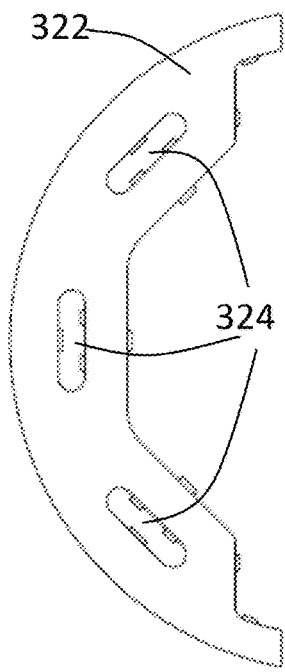  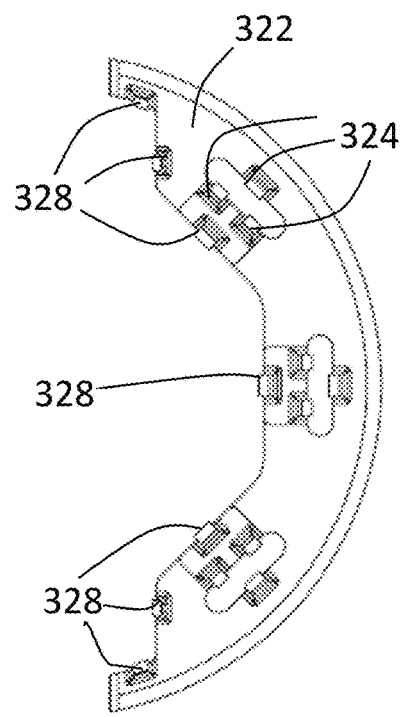
FIG. 4J　　　　　FIG. 4L　　　　　FIG. 4K
FIG. 4M 510
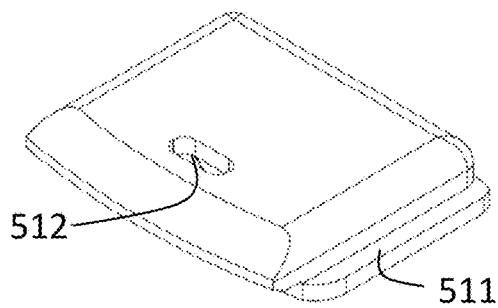
FIG. 5A
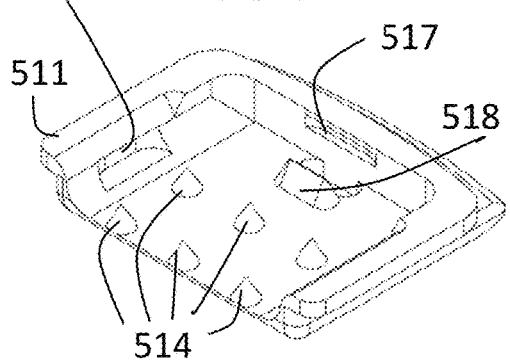
FIG. 5B
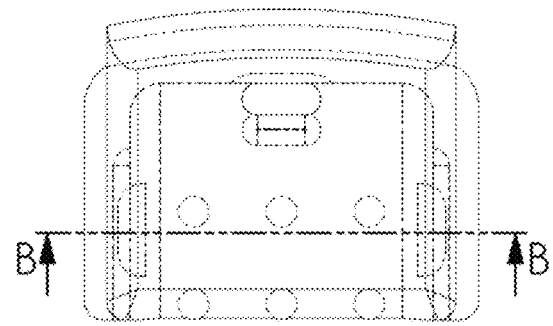
FIG. 5C
SECTION B-B
SCALE 6:1
FIG. 5D
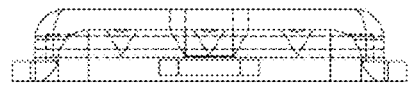
FIG. 5E

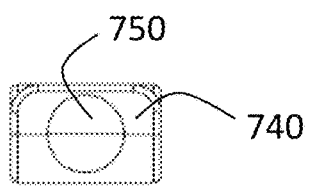
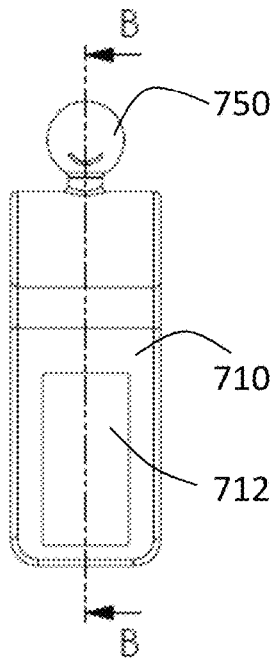
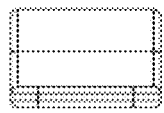
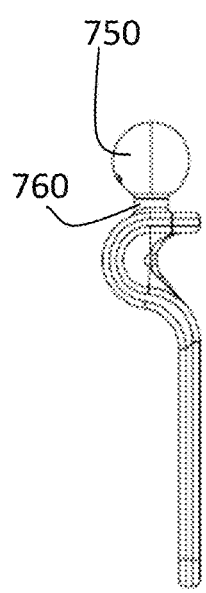
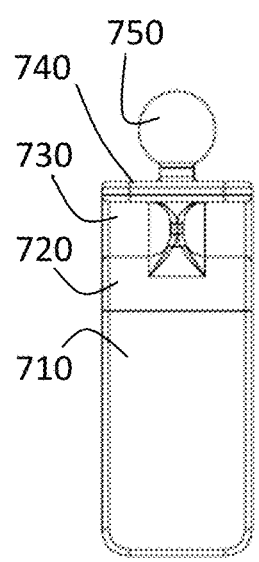
FIG. 8G
FIG. 8C
FIG. 8H SECTION B-B SCALE 1.5:1
FIG. 8E
FIG. 8D
FIG. 8F

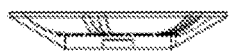
FIG. 10E
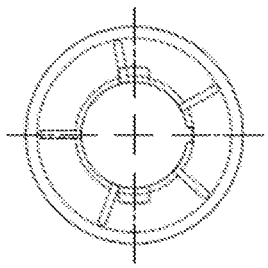 
FIG. 10C    FIG. 10D              950
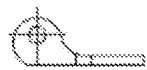                    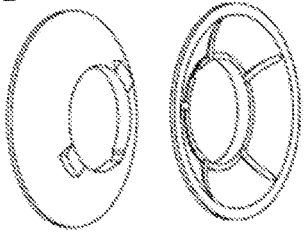
FIG. 11D          FIG. 10A   FIG. 10B
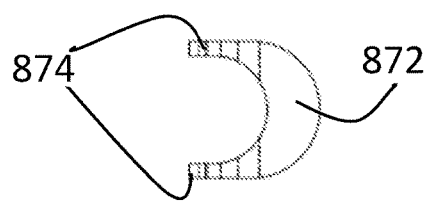 
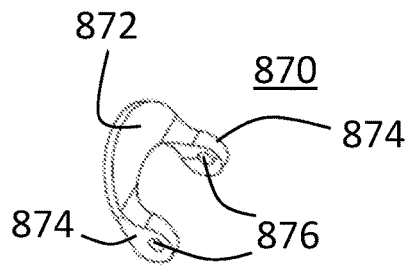
FIG. 11B    FIG. 11C
FIG. 11A

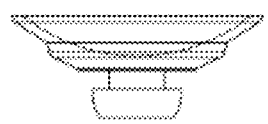
FIG. 12D
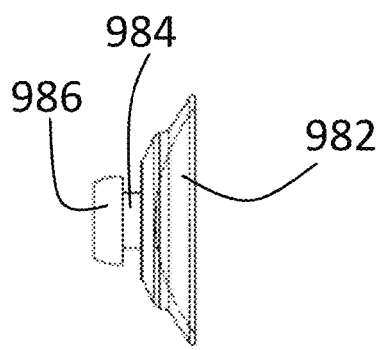
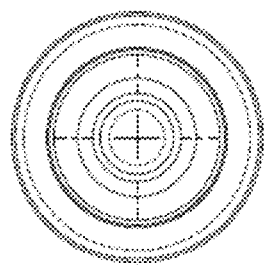
FIG. 12B    FIG. 12C
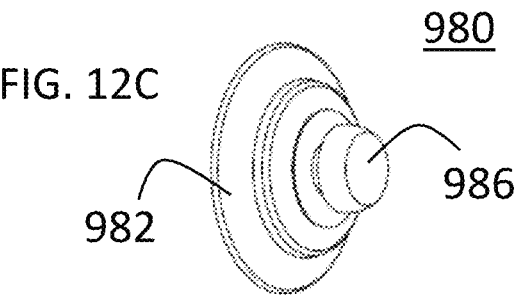
FIG. 12A
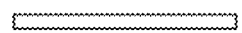
FIG. 13D
      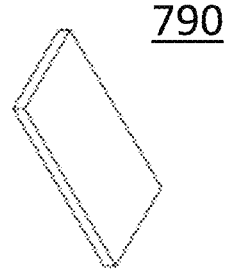
FIG. 13B    FIG. 13C
FIG. 13A

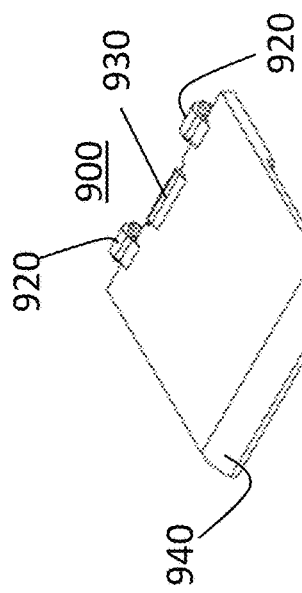
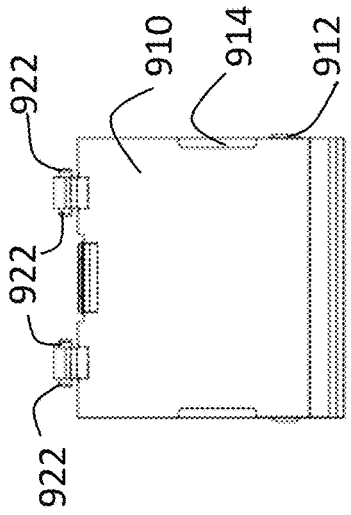
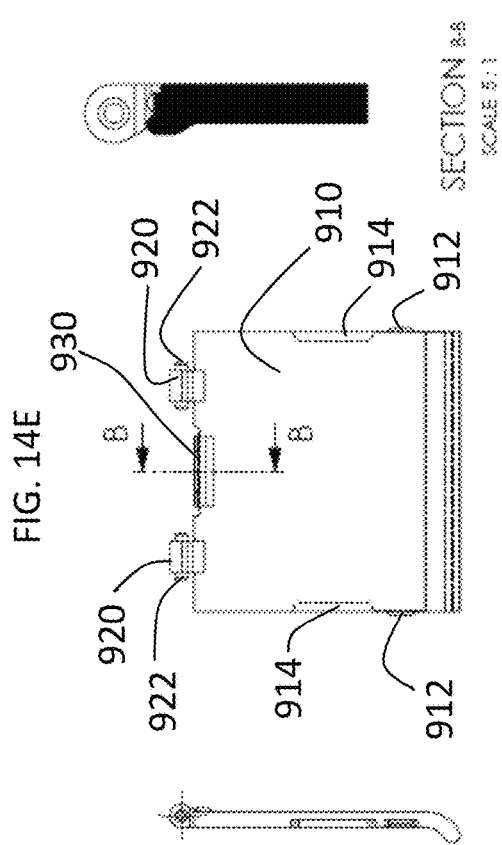

MOBILE DEVICE ACCESSORY

CROSS-REFERENCE TO RELATED APPLICATIONS

The present application claims the benefit of the filing dates of U.S. Provisional Patent Application Ser. No. 62/348,221 filed by the present inventor on Jun. 10, 2016 and U.S. Provisional Patent Application Ser. No. 62/348,224 filed by the present inventor on Jun. 10, 2016.

The aforementioned provisional patent applications are hereby incorporated by reference in their entirety.

STATEMENT REGARDING FEDERALLY SPONSORED RESEARCH OR DEVELOPMENT

None.

BACKGROUND OF THE INVENTION

Field of the Invention

The present invention relates to accessories for mobile electronic devices, and more particularly, to a case having features to hold, stand and hang a mobile electronic device.

Brief Description of the Related Art

A variety of different accessories for assisting users with holding a mobile device have been disclosed and marketed. Such devices include those disclosed in U.S. Patent Application Publication Nos. 2013/0240380A1, 2015/365125A1, 2014/364176A1, 2014/221055A1 and 2014/217135A1 as well as U.S. Pat. No. 9,226,567 and others.

SUMMARY OF THE INVENTION

In a preferred embodiment, the present invention is a mobile device accessory assembly having a plurality of mobile device accessories. The assembly has a body member having a durable shell member having a shape to accommodate a mobile device, a recess for receiving a metal piece, a circular central accessory opening with a lip around a portion of the circumference of the central accessory opening, a lower accessory opening, and a hinge structure at an edge of the lower accessory opening and a metal piece secured in the recess in the durable shell. A holding accessory is rotatably secured in the circular central accessory opening in the durable shell. A hanging accessory is secured by a magnet to the metal piece in the recess in the durable shell. A standing accessory having a hinge member secured to the hinge member in the lower accessory opening in the durable shell.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 1C is a front view of a mobile device accessory assembly with a case and three accessories in accordance with a preferred embodiment of the present invention.

FIG. 1D is a rear view of a mobile device accessory assembly with a case and three accessories in accordance with a preferred embodiment of the present invention.

FIG. 1E is a left side view of a mobile device accessory assembly with a case and three accessories in accordance with a preferred embodiment of the present invention.

FIG. 1F is a right side view of a mobile device accessory assembly with a case and three accessories in accordance with a preferred embodiment of the present invention.

FIG. 1G is a bottom view of a mobile device accessory assembly with a case and three accessories in accordance with a preferred embodiment of the present invention.

FIG. 1H is a top view of a mobile device accessory assembly with a case and three accessories in accordance with a preferred embodiment of the present invention.

FIG. 1J is a rear view of a mobile device accessory assembly with a case and one accessory in accordance with a preferred embodiment of the present invention.

FIG. 1K is a side view of a mobile device accessory assembly with a case and one accessory in accordance with a preferred embodiment of the present invention.

FIG. 1L is a top view of a mobile device accessory assembly with a case and one accessory in accordance with a preferred embodiment of the present invention.

FIG. 1M is a cross-sectional view of a mobile device accessory assembly with a case and one accessory in accordance with a preferred embodiment of the present invention.

FIG. 2B is a front view of a mobile device accessory case in accordance with a preferred embodiment of the present invention.

FIG. 2C is a rear view of a mobile device accessory case in accordance with a preferred embodiment of the present invention.

FIG. 3A is a rear perspective view of a mobile device holding accessory assembly in accordance with a preferred embodiment of the present invention.

FIG. 3B is a front perspective view of a mobile device holding accessory assembly in accordance with a preferred embodiment of the present invention.

FIG. 4J is a front view of a component part of a mobile device holding accessory support member in accordance with a preferred embodiment of the present invention.

FIG. 4K is a rear view of a component part of a mobile device holding accessory support member in accordance with a preferred embodiment of the present invention.

FIG. 4L is a right side view of a component part of a mobile device holding accessory support member in accordance with a preferred embodiment of the present invention.

FIG. 4M is a left side view of a component part of a mobile device holding accessory support member in accordance with a preferred embodiment of the present invention.

FIG. 5A is a top perspective view of a top portion of a clip for a mobile device holding accessory in accordance with a preferred embodiment of the present invention.

FIG. 5B is a bottom perspective view of a top portion of a clip for a mobile device holding accessory in accordance with a preferred embodiment of the present invention.

FIG. 5C is a top view of a top portion of a clip for a mobile device holding accessory in accordance with a preferred embodiment of the present invention.

FIG. 5D is a cross-sectional view of a top portion of a clip for a mobile device holding accessory in accordance with a preferred embodiment of the present invention.

FIG. 5E is a side view of a top portion of a clip for a mobile device holding accessory in accordance with a preferred embodiment of the present invention.

FIG. 8C is a front view of a support member of a mobile device hanging accessory assembly in accordance with a preferred embodiment of the present invention.

accessory assembly in accordance with a preferred embodiment of the present invention.

Figure 8A:
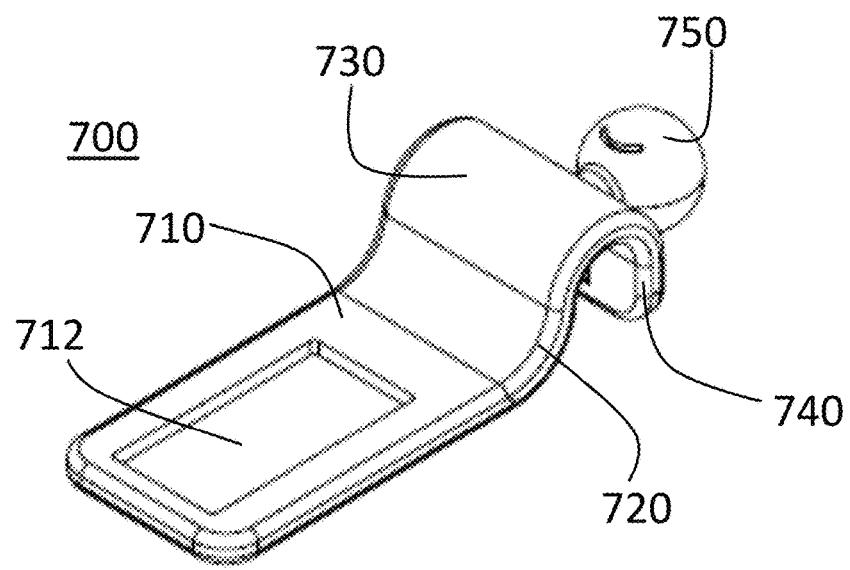
FIG. 8A is a front perspective view of a support member of a mobile device hanging accessory assembly in accordance with a preferred embodiment of the present invention.
Figure 8B:
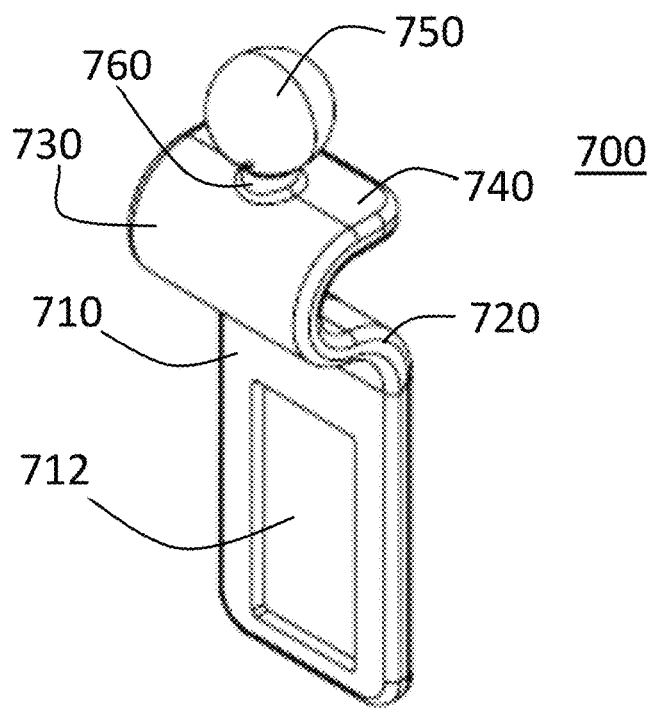
FIG. 8B is a top perspective view of a support member of a mobile device hanging accessory assembly in accordance with a preferred embodiment of the present invention.

FIG. 8D is a rear view of a support member of a mobile device hanging accessory assembly in accordance with a preferred embodiment of the present invention.

FIG. 8E is a side view of a support member of a mobile device hanging accessory assembly in accordance with a preferred embodiment of the present invention.

FIG. 8F is a bottom view of a support member of a mobile device hanging accessory assembly in accordance with a preferred embodiment of the present invention.

FIG. 8G is a top view of a support member of a mobile device hanging accessory assembly in accordance with a preferred embodiment of the present invention.

FIG. 8H is a side cross-sectional view of a support member of a mobile device hanging accessory assembly in accordance with a preferred embodiment of the present invention.

FIG. 9A is a perspective view of a rotating support member of a mobile device hanging accessory assembly in accordance with a preferred embodiment of the present invention.

Figure 9C:
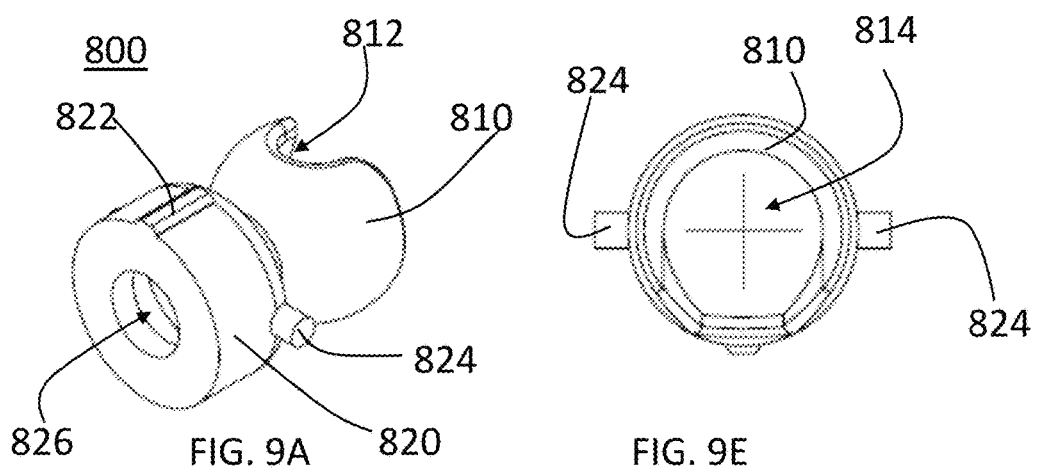
Figure 9C:
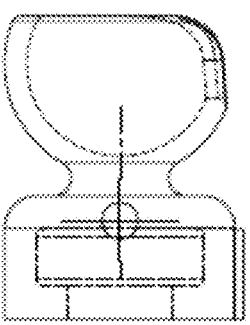
Figure 9B:
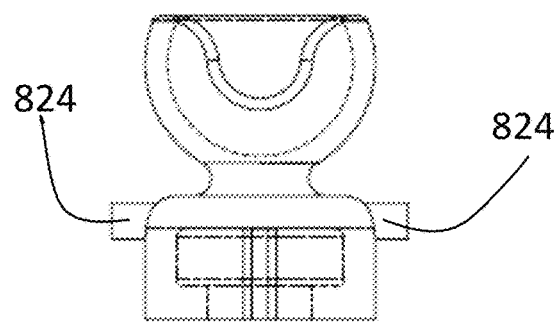

FIG. 9B is a front view of a rotating support member of a mobile device hanging accessory assembly in accordance with a preferred embodiment of the present invention.

FIG. 9C is a side view of a rotating support member of a mobile device hanging accessory assembly in accordance with a preferred embodiment of the present invention.

Figure 9D:
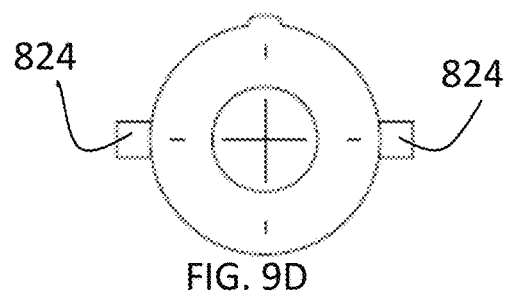

FIG. 9D is a bottom view of a rotating support member of a mobile device hanging accessory assembly in accordance with a preferred embodiment of the present invention.

FIG. 9E is a top view of a rotating support member of a mobile device hanging accessory assembly in accordance with a preferred embodiment of the present invention.

FIG. 10A is a rear perspective view of a suction cup support member of a mobile device hanging accessory assembly in accordance with a preferred embodiment of the present invention.

FIG. 10B is a front perspective view of a suction cup support member of a mobile device hanging accessory assembly in accordance with a preferred embodiment of the present invention.

FIG. 10C is a front view of a suction cup support member of a mobile device hanging accessory assembly in accordance with a preferred embodiment of the present invention.

FIG. 10D is a side view of a suction cup support member of a mobile device hanging accessory assembly in accordance with a preferred embodiment of the present invention.

FIG. 10E is a top view of a suction cup support member of a mobile device hanging accessory assembly in accordance with a preferred embodiment of the present invention.

FIG. 11A is a perspective view of a suction cup clip member of a mobile device hanging accessory assembly in accordance with a preferred embodiment of the present invention.

FIG. 11B is a front view of a suction cup clip member of a mobile device hanging accessory assembly in accordance with a preferred embodiment of the present invention.

FIG. 11C is a side view of a suction cup clip member of a mobile device hanging accessory assembly in accordance with a preferred embodiment of the present invention.

FIG. 11D is a top view of a suction cup clip member of a mobile device hanging accessory assembly in accordance with a preferred embodiment of the present invention.

FIG. 12A is a rear perspective view of a suction cup of a mobile device hanging accessory assembly in accordance with a preferred embodiment of the present invention.

FIG. 12B is a rear view of a suction cup of a mobile device hanging accessory assembly in accordance with a preferred embodiment of the present invention.

FIG. 12C is a side view of a suction cup of a mobile device hanging accessory assembly in accordance with a preferred embodiment of the present invention.

FIG. 12D is a top view of a suction cup of a mobile device hanging accessory assembly in accordance with a preferred embodiment of the present invention.

FIG. 13A is a perspective view of a magnet a mobile device hanging accessory assembly in accordance with a preferred embodiment of the present invention.

FIG. 13B is a front view of a magnet a mobile device hanging accessory assembly in accordance with a preferred embodiment of the present invention.

FIG. 13C is a side view of a magnet a mobile device hanging accessory assembly in accordance with a preferred embodiment of the present invention.

FIG. 13D is a top view of a magnet a mobile device hanging accessory assembly in accordance with a preferred embodiment of the present invention.

FIG. 14A is a perspective view of a mobile device standing accessory in accordance with a preferred embodiment of the present invention.

FIG. 14B is a front view of a mobile device standing accessory in accordance with a preferred embodiment of the present invention.

FIG. 14C is a rear view of a mobile device standing accessory in accordance with a preferred embodiment of the present invention.

FIG. 14D is a bottom view of a mobile device standing accessory in accordance with a preferred embodiment of the present invention.

FIG. 14E is a top view of a mobile device standing accessory in accordance with a preferred embodiment of the present invention.

FIG. 14F is a side view of a mobile device standing accessory in accordance with a preferred embodiment of the present invention.

FIG. 14G is a side cross-sectional view of a mobile device standing accessory in accordance with a preferred embodiment of the present invention.

DETAILED DESCRIPTION OF THE PREFERRED EMBODIMENTS

Preferred embodiments of the present invention will be described with referenced to the drawings. FIG. 1A-1H show a mobile device accessory assembly 100 having a case or body member 200, a holding accessory assembly 300, a hanging accessory assembly 600 and a stand accessory 900. The mobile device accessory assembly of the present invention may have one or all three of the accessories 300, 600 and 900 and may have other or different accessories. FIGS. 1I-1M show an example in which the case or body member 200 has only a holding accessory assembly 300 attached to it.

FIGS. 2A-2F show a case or body member 200 of a mobile device accessory assembly 100 in accordance with a preferred embodiment of the present invention. The case or body member 200 has a durable shell 210 having an opening 220 for corresponding to a camera, flash or light on a mobile device placed in the case 200, a recess 230, a central accessory opening 240 and a lower accessory opening 250. The durable shell may be made from, for example, plastic or other durable material. A metal piece is secured to the shell 210 in recess 230, for example, with an adhesive such as glue. Once secured into recess 230, the metal piece 232 sits flush with the shell 210 to provide easy sliding of the case 200, for example, into a pocket or purse. Around the central accessory opening there is a lip 410. At the upper side of the lower accessory opening the case 200 has a hinge post receiving structure 252 for receiving hinge posts on a mobile device accessory.

FIG. 3A-3G illustrate a mobile device holding accessory assembly 300. The assembly 300 has a support member 400, two stay members 320, two clips 330 and an elastic band 340. The support member 400, shown in FIGS. 4A-4G, has circular base 410, a plurality of posts 420 extending from a rear face of the base 410 and positioned around a circumference of that base 410, two guide members 440 extending from the rear face of the base 410 and extending substantially across a diameter of the base, a first clip-receiving hole 430 positioned adjacent each post 420 on a side nearest a central axis of the base, and a second clip-receiving hole 450 positioned adjacent each post further from the central axis of the base. The two stay members 320 are identical with one another. A stay member is shown in FIGS. 4H-4M. Each stay member 320 has a rigid body 322 having a plurality of openings 324 for receiving posts 420. Around each opening 324, the stay member 320 has a plurality of snap-in members 326, each having an angled surface for allowing the stay member 320 to be snapped onto the support member 400. The stay member 320 further has a plurality of snap-in members 328 for snapping under an edge of guide members 440.

The holding assembly further has a pair of clips 500, which are shown in FIGS. 5A-5J for holding an elastic band 340, shown win FIGS. 6A-6F. Each holding clip has a top 510 (FIGS. 5A-5E) and a bottom 520 (FIGS. 5F-5J). The top 510 has a top hole 512, a lip 511, side holes 516, front hole 517, spikes 514, and post 518. The bottom 520 has front post 522, side posts 526 and spikes 524.

To assemble the holding assembly, each end of the nylon band 340 is placed onto a bottom 520 of a clip on the spikes 524 and then the top 510 of the is placed over the band and snapped into the bottom such that the end of the band is pinched between the top 510 and the bottom 520 and the spikes 514, 524 grip the band to hold it in place. In addition to the spikes 514,524, an adhesive or glue also may be used to further secure the ends of the band into the clips. Each clip is then connected to the base 410 by sliding the lip 511 of the clip under the guide members 440 on the base 410. In this manner, the band is slidingly connected to the base 410.

Figure 1A:
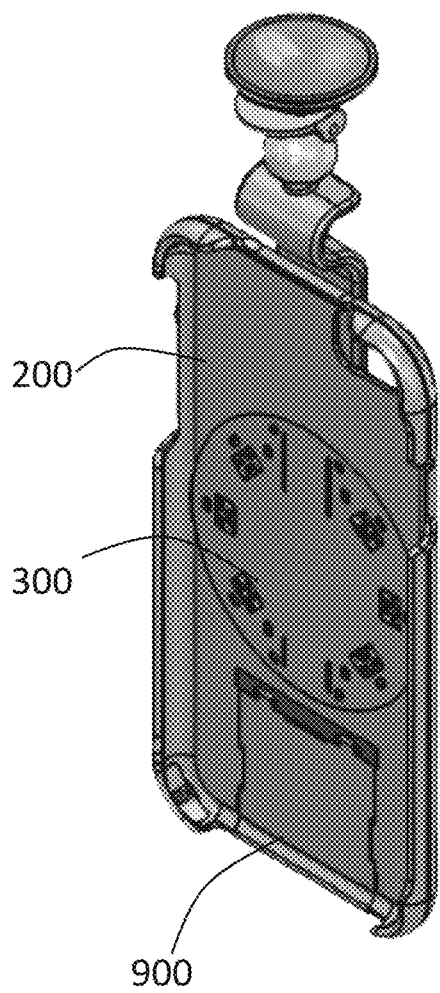
FIG. 1A is a front perspective view of a mobile device accessory assembly with a case and three accessories in accordance with a preferred embodiment of the present invention.
Figure 1B:
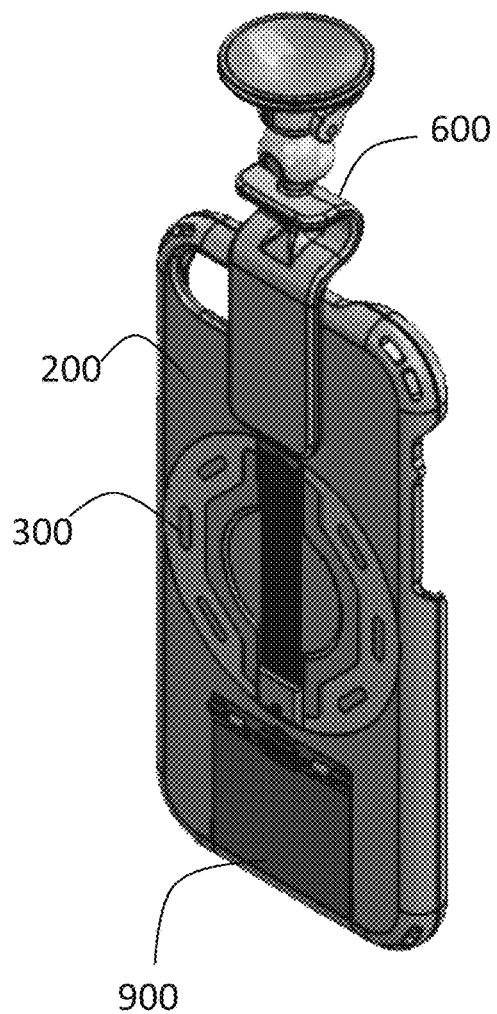
FIG. 1B is a rear perspective view of a mobile device accessory assembly with a case and three accessories in accordance with a preferred embodiment of the present invention.
Figure 1I:
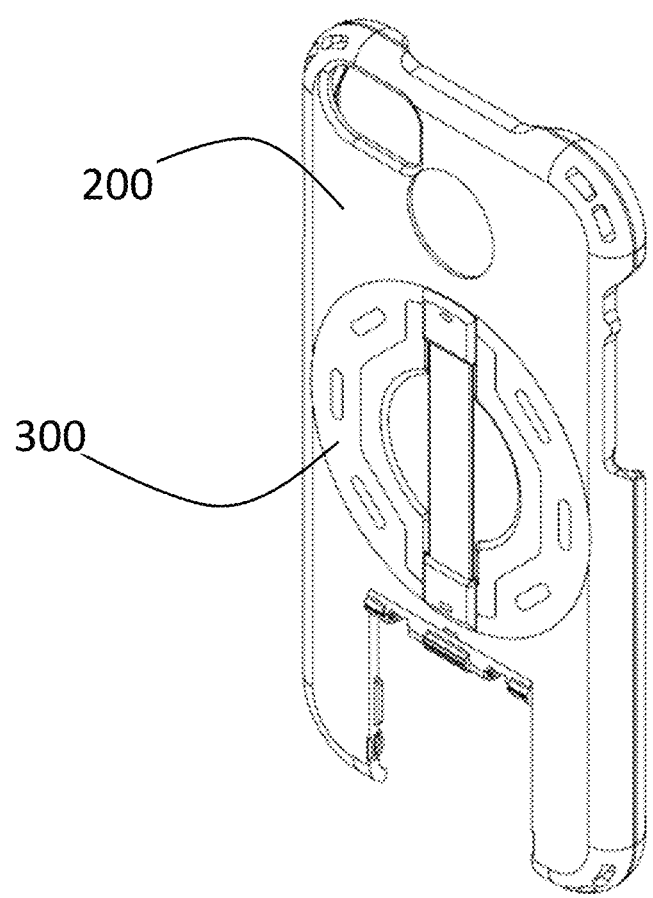
FIG. 1I is a rear perspective view of a mobile device accessory assembly with a case and one accessory in accordance with a preferred embodiment of the present invention.
Figure 2A:
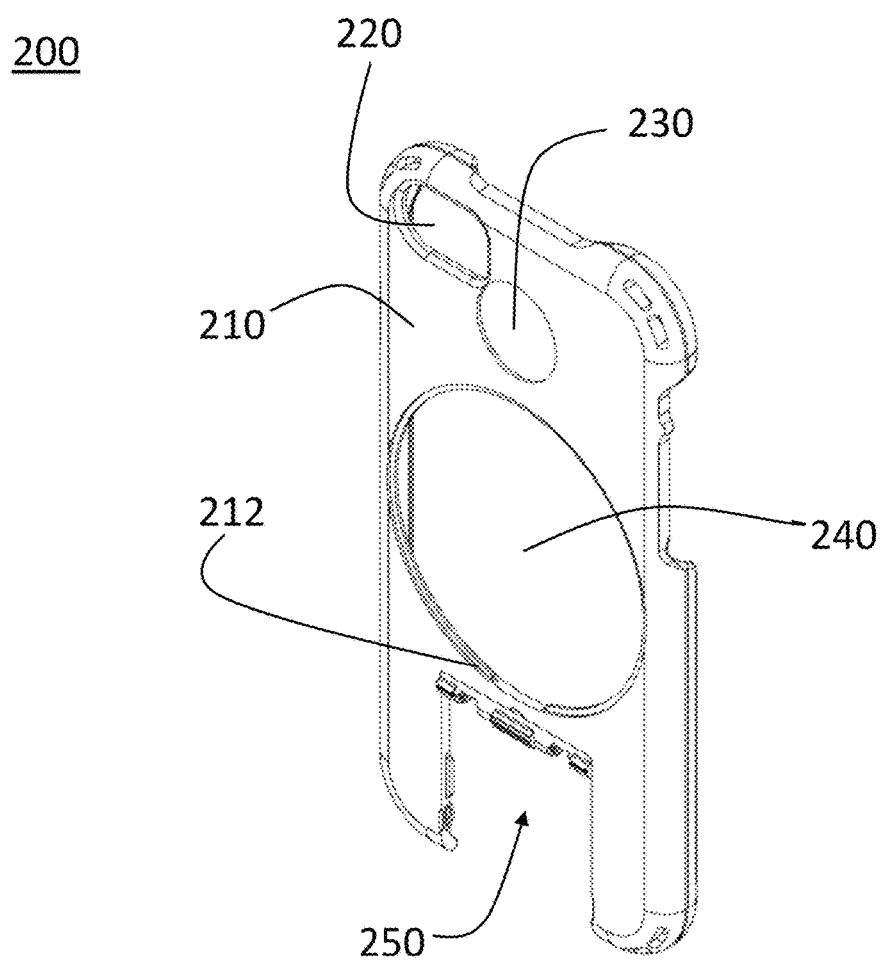
FIG. 2A is a rear perspective view of a mobile device accessory case in accordance with a preferred embodiment of the present invention.
Figure 2D:
FIG. 2D is a left side view of a mobile device accessory case in accordance with a preferred embodiment of the present invention.
Figure 2E:
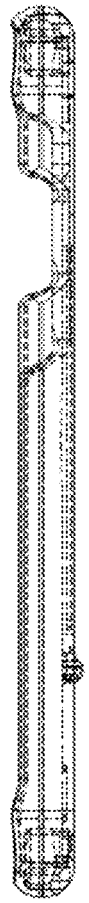
FIG. 2E is a right side view of a mobile device accessory case in accordance with a preferred embodiment of the present invention.
Figure 2F:
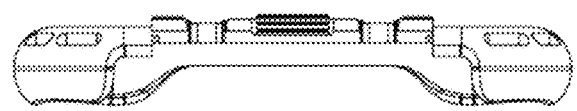
FIG. 2F is a bottom view of a mobile device accessory case in accordance with a preferred embodiment of the present invention.
Figure 3G:
FIG. 3G is a top view of a mobile device holding accessory assembly in accordance with a preferred embodiment of the present invention.
Figures 3C, 3D, 3E:
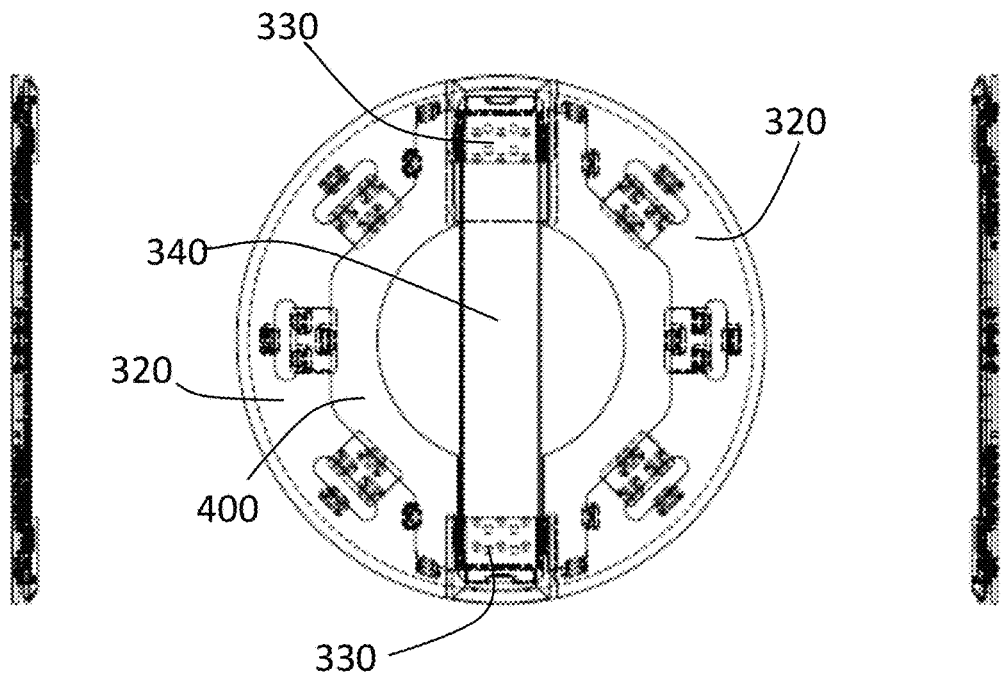
FIGS. 3C and 3H are rear views of a mobile device holding accessory assembly in first and second positions in accordance with a preferred embodiment of the present invention.
FIG. 3D is a left side view of a mobile device holding accessory assembly in accordance with a preferred embodiment of the present invention.
FIG. 3E is a right side view of a mobile device holding accessory assembly in accordance with a preferred embodiment of the present invention.
Figure 3F:
FIG. 3F is a bottom view of a mobile device holding accessory assembly in accordance with a preferred embodiment of the present invention.
Figure 3H:
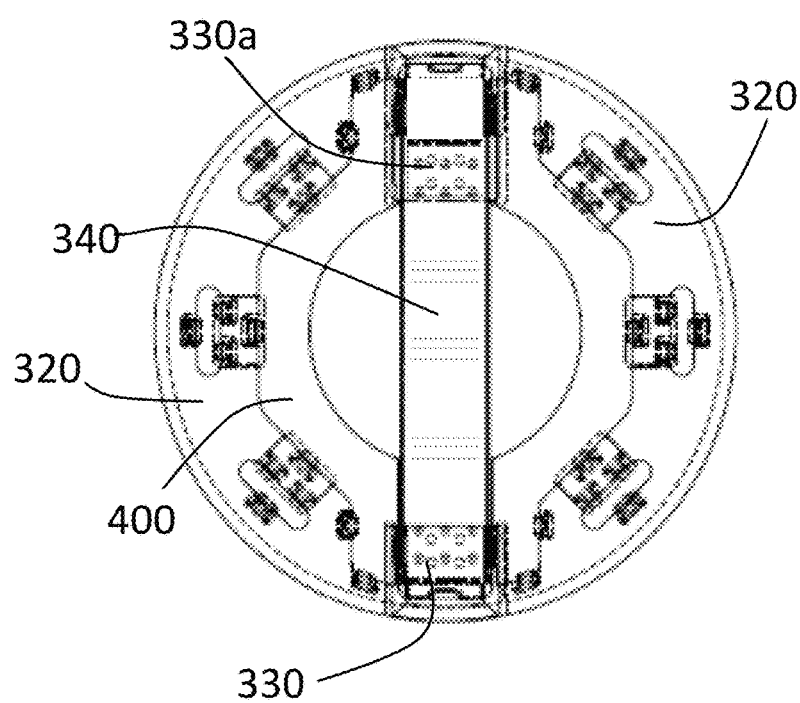
Figure 4A:
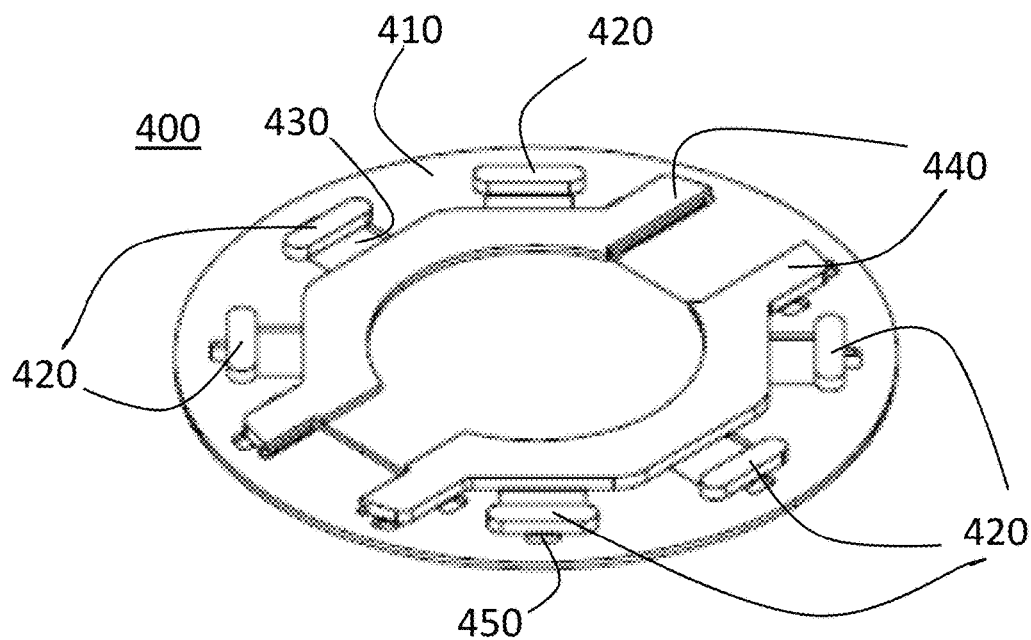
FIG. 4A is a rear perspective view of a mobile device holding accessory support member in accordance with a preferred embodiment of the present invention.
Figure 4B:
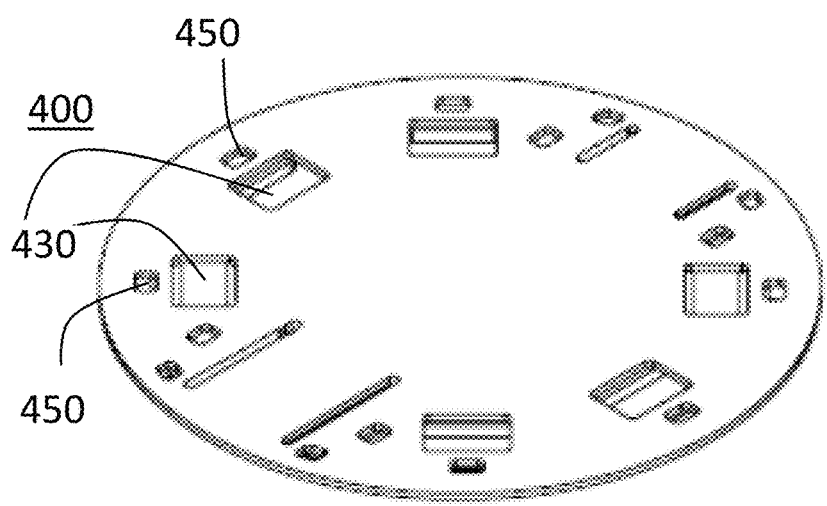
FIG. 4B is a front perspective view of a mobile device holding accessory support member in accordance with a preferred embodiment of the present invention.
Figure 4G:
FIG. 4G is a top view of a mobile device holding accessory support member in accordance with a preferred embodiment of the present invention.
Figures 4C, 4D, 4E:
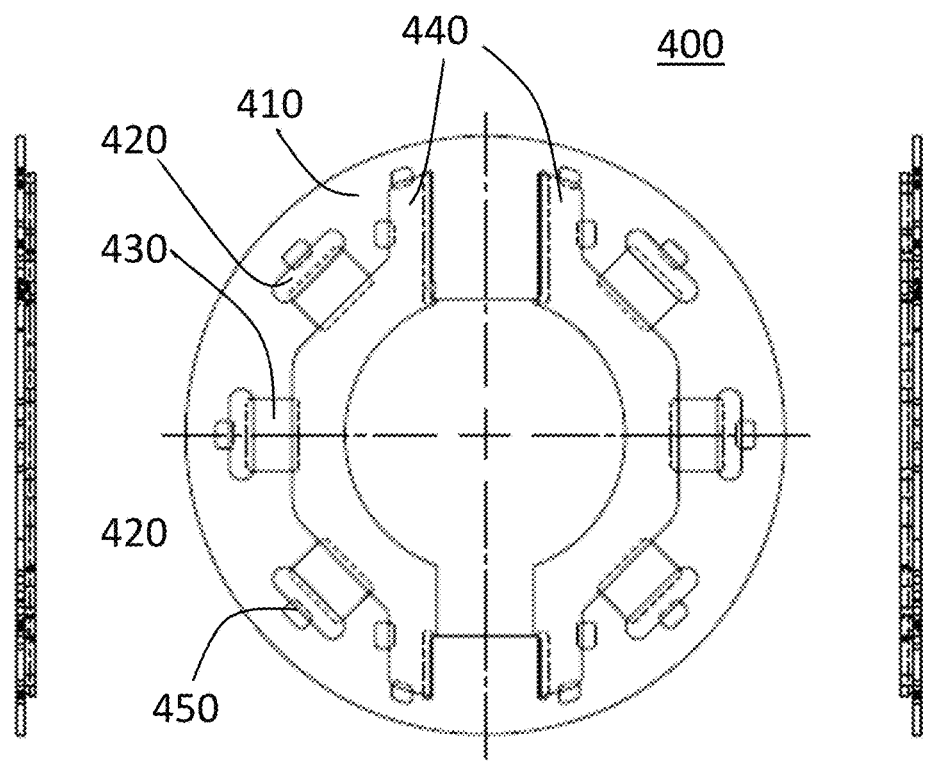
FIG. 4C is a rear view of a mobile device holding accessory support member in accordance with a preferred embodiment of the present invention.
FIG. 4D is a left side view of a mobile device holding accessory support member in accordance with a preferred embodiment of the present invention.
FIG. 4E is a right side view of a mobile device holding accessory support member in accordance with a preferred embodiment of the present invention.
Figure 4F:
FIG. 4F is a bottom view of a mobile device holding accessory support member in accordance with a preferred embodiment of the present invention.
Figure 4H:
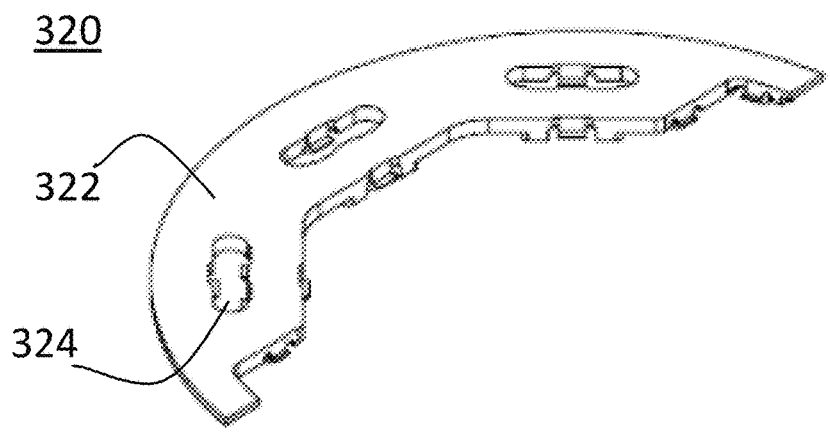
FIG. 4H is a front perspective view of a component part of a mobile device holding accessory support member in accordance with a preferred embodiment of the present invention.
Figure 4I:
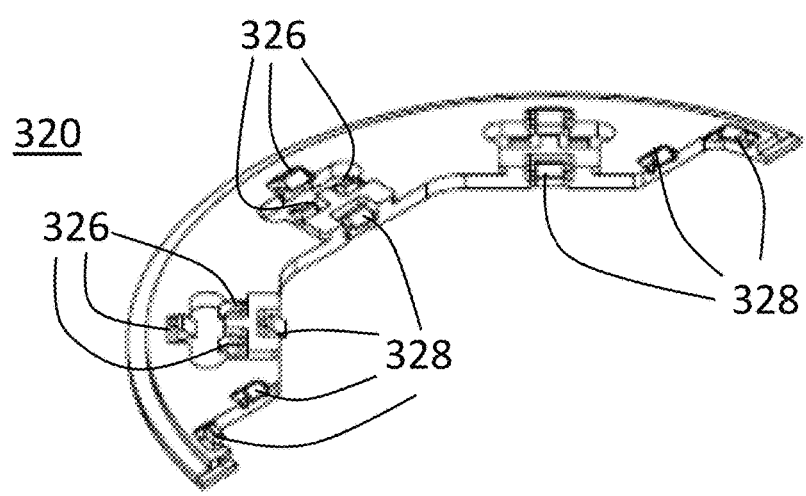
FIG. 4I is a rear perspective view of a component part of a mobile device holding accessory support member in accordance with a preferred embodiment of the present invention.
Figure 5F:
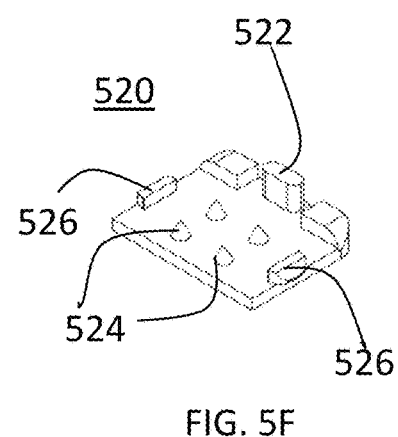
FIG. 5F is a top perspective view of a bottom portion of a clip for a mobile device holding accessory in accordance with a preferred embodiment of the present invention.
Figure 5G:
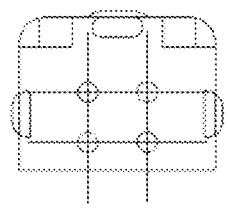
FIG. 5G is a top view of a bottom portion of a clip for a mobile device holding accessory in accordance with a preferred embodiment of the present invention.
Figure 5J:
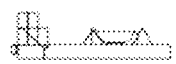
FIG. 5J is a side view of a top portion of a clip for a mobile device holding accessory in accordance with a preferred embodiment of the present invention.
Figure 5I:
FIG. 5I is an end view of a top portion of a clip for a mobile device holding accessory in accordance with a preferred embodiment of the present invention.
Figure 5H:
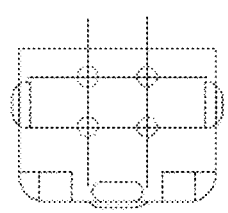
FIG. 5H is a bottom view of a top portion of a clip for a mobile device holding accessory in accordance with a preferred embodiment of the present invention.
Figure 6A:
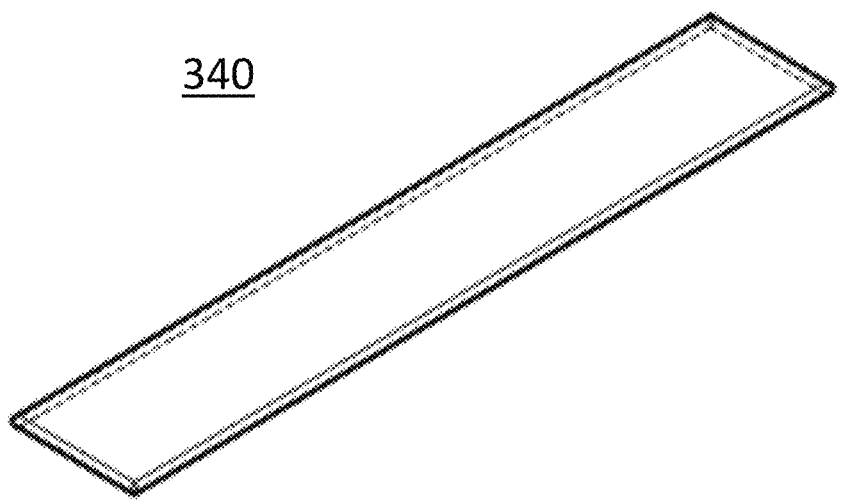
FIG. 6A is a perspective view of an elastic band for a mobile device holding accessory in accordance with a preferred embodiment of the present invention.
Figure 6F:
FIG. 6F is a top view of an elastic band for a mobile device holding accessory in accordance with a preferred embodiment of the present invention.
Figures 6B, 6C, 6D:
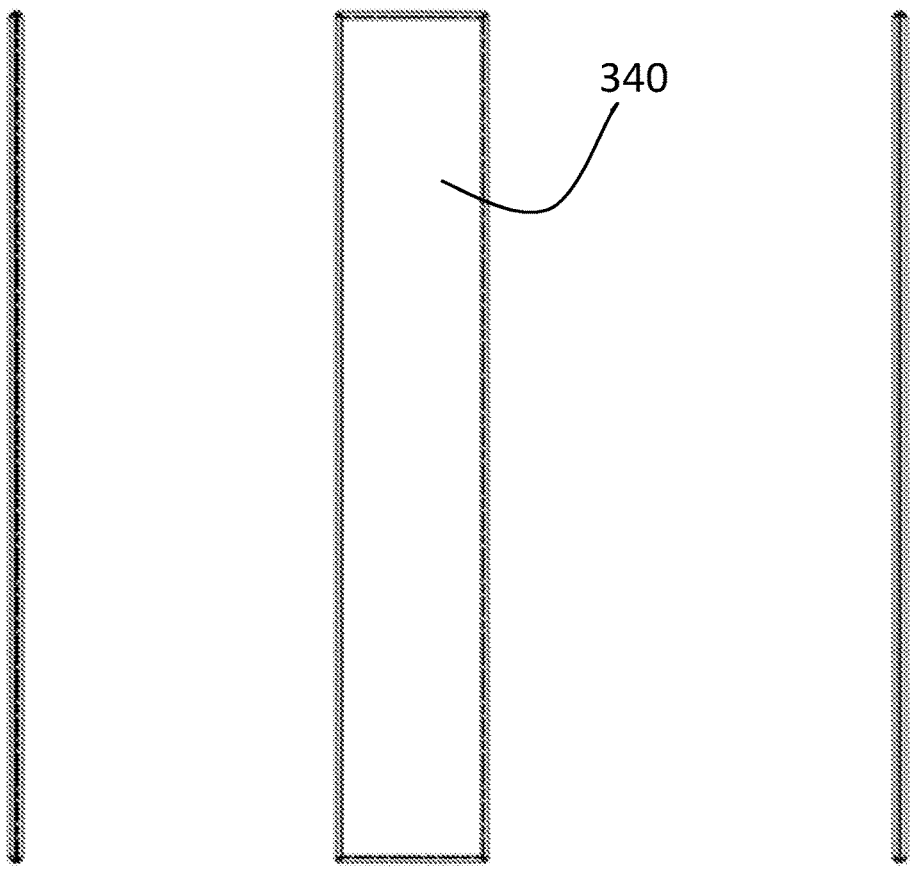
FIG. 6B is a top view of an elastic band for a mobile device holding accessory in accordance with a preferred embodiment of the present invention.
FIG. 6C is a right side view of an elastic band for a mobile device holding accessory in accordance with a preferred embodiment of the present invention.
FIG. 6D is a left view of an elastic band for a mobile device holding accessory in accordance with a preferred embodiment of the present invention.
Figure 6E:
FIG. 6E is a bottom view of an elastic band for a mobile device holding accessory in accordance with a preferred embodiment of the present invention.
Figure 7A:
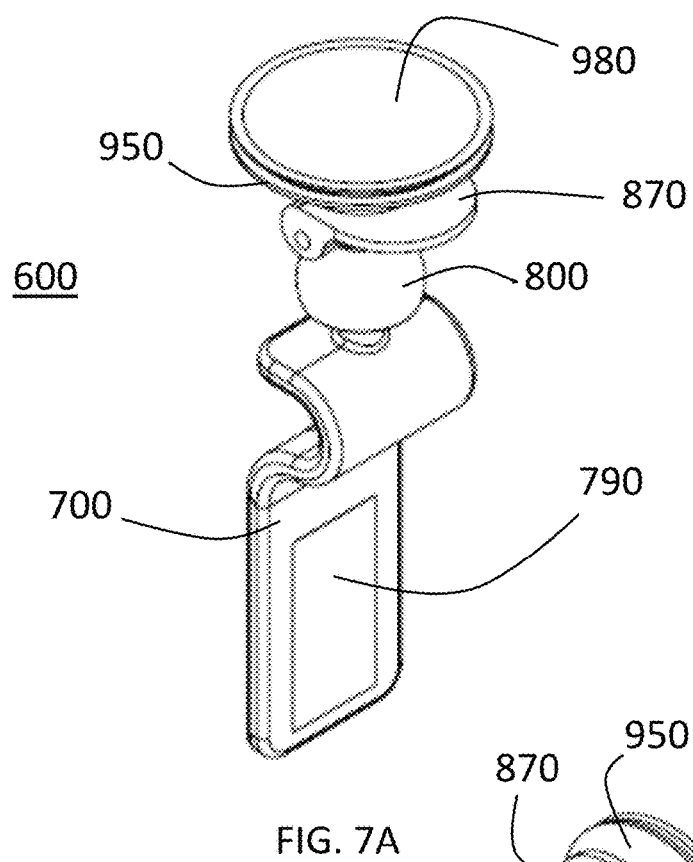
FIG. 7A is a first perspective view of a mobile device hanging accessory assembly in accordance with a preferred embodiment of the present invention.
Figure 7B:
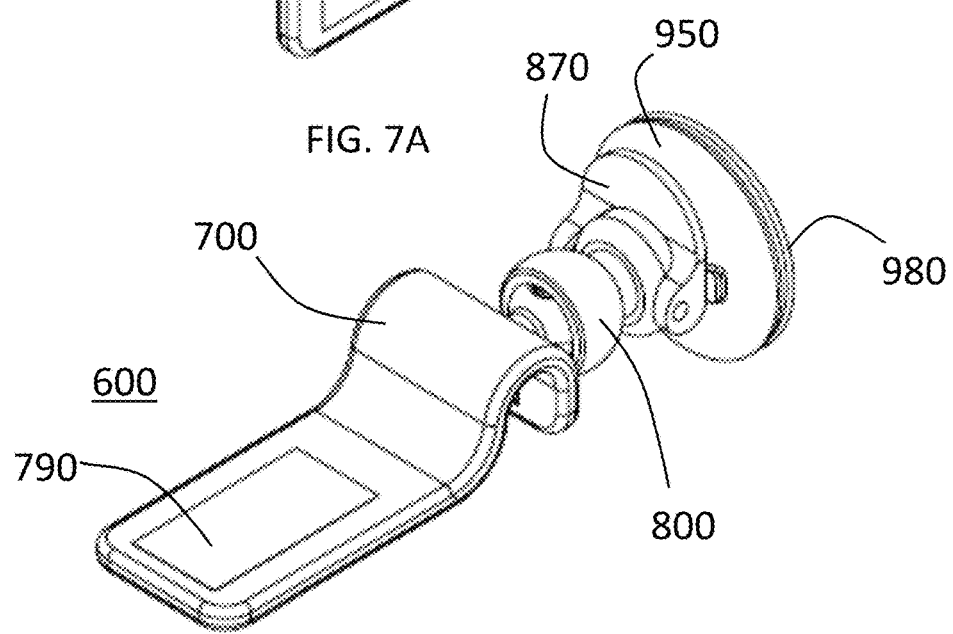
FIG. 7B is a second perspective view of a mobile device hanging accessory assembly in accordance with a preferred embodiment of the present invention.
Figure 7F:
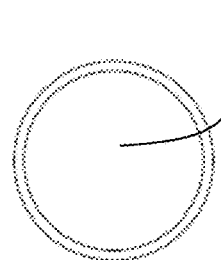
FIG. 7F is a top view of a mobile device hanging accessory assembly in accordance with a preferred embodiment of the present invention.
Figure 7C:
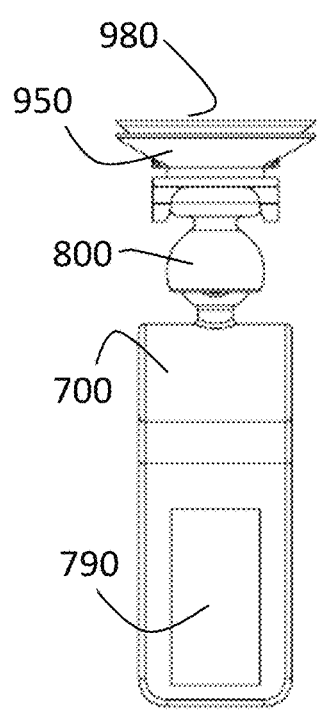
FIG. 7C is a front view of a mobile device hanging accessory assembly in accordance with a preferred embodiment of the present invention.
Figure 7E:
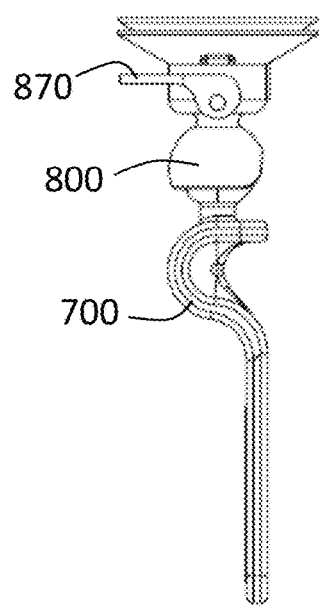
FIG. 7E is a right side view of a mobile device hanging accessory assembly in accordance with a preferred embodiment of the present invention.
Figure 7D:
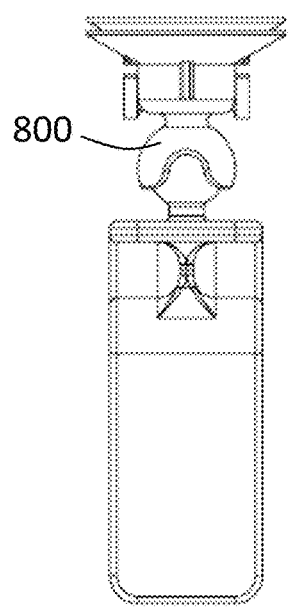
FIG. 7D is a rear view of a mobile device hanging accessory assembly in accordance with a preferred embodiment of the present invention.

The base 410 is then placed onto the front of the case 200 such that stays 320 extend into the central opening 240 past the lip 212 toward the rear of the case 200. Stays 320 are then snapped onto the base 410 as shown in FIG. 1M. This secures the base 310 to the case 200 at the opening 240 but allows the base 310 to rotate within the opening 240 in the case. With this structure, the clips are approximately flush with the case. When the clips 330 are positioned outwardly as far as possible, the band 340 lies flat and also is essentially flush with the back of the case. This allows the case to easily slide in or out of, for example, a pocket or purse. If one of the clips (chip 330a in FIG. 3H) is moved toward the center of the case the band buckles forming a loop through which a user may insert a finger to allow easy holding and manipulation of a mobile devise in the case.

A mobile device hanging accessory assembly 600 is shown in FIGS. 7A-7F. The hanging assembly has a main body member 700, a magnet or polymagnet 790 attached to the main body member 790, a rotator cup member 800, a suction lever 870, a suction cup shape keeper 950 and a suction cup 980. The main body member 700 has a magnet support section 710 having a recess 712 for receiving a polymagnet, a first curved section 720, a second curve section 730, a support section 740 and a ball joint 750 on a post or neck 760. A polymagnet 790, shown in FIGS. 13A-13D, is secured to the support section 710 in the recess 712, for example, with an adhesive. The first and second curved sections provide for a case 200 connected to the support section to hang substantially directly below the ball joint 750.

The rotator cup member 800 has a cupped section 810 for receiving a ball joint 750 of main body member 700. The cupped section 810 has a curved relief 812 in one side to provide for 90° tilt of the ball joint 750 in the cupped section 810 in the direction of the curved relief 812 because the neck 760 can rotate into the curved relief 812. In this manner the ball and cup joint formed by ball joint 750 and cupped member 810 provides for the magnet support section, and hence a mobile device or device case attached to the magnet support section, to rotate 360°, to tile to some extent, e.g., 45° in all directions and tile 90° in the direction of the curved relief 812. The rotator cup member 800 further has a pair of posts 824 to which suction lever 870 attaches and a ridge 822. The rotatory cup member 800 further has neck 820 having an opening 826 for receiving a suction cup support 986. As shown in FIGS. 9B-9C, the interior of the neck 820 has a structure to allow the suction cup support member to be compressed and inserted into the opening 826 and then expand inside the neck 820 to secure the suction cup. Additional means such as an adhesive may be inserted into opening 826 prior to insertion of the suction cup support member 983 to further secure the suction cup support member 986 and suction cup neck 984 to the rotator cup 820. The suction lever 870 has a pair of arms 874 each having a hole 876 for placement onto posts 824 of the rotator cup and a body member 872 between the two arms 874. The suction cup shape keeper 950 is placed over the suction cup support member 986 and neck 984 prior to insertion of the suction cup support member 986 being inserted into the hole 826.

To removably connect the case 200 to the hanging accessory assembly, the polymagnet 790 is placed next to the metal piece 232 on the case 200. The suction cup 980 can then be attached to a surface such as a window by being pressed against the surface and then moving the suction lever 870.

A mobile device standing accessory is shown in FIGS. 14A-14G. The standing accessory has a body 910 having a protruding element 912 on each side, a recess 914 on each side, a pair of hinge members 920 having hinge posts 922 and a stop member 930. The standing accessory is connected to the case 200 in the lower opening 250 by snapping posts 922 into the hinge element 252 on the case. This hinge mechanism allows the body 910 to be rotated from position flush with the case 200 to a position, for example, at approximately a 45° angle with the case at which point the stop member 930 presses against the case to stop further movement. With this structure, a mobile device in the case 200 can be placed in a standing position on either vertically or horizontally on a surface when the standing accessory is at the 45° angle with the case but then can easily be stored in a pocket or purse by rotating (or closing) the standing accessory as shown in in FIG. 1A to make the accessory flush with the case.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A mobile device accessory assembly comprising:
a body member comprising:
a durable shell member having a shape to accommodate a mobile device, a recess, a circular central accessory opening with a lip around a portion of the circumference of the central accessory opening, a lower accessory opening, and a hinge structure at an edge of said lower accessory opening;
a metal piece secured in said recess in said durable shell; and
a holding accessory rotatably secured in said circular central accessory opening in said durable shell, said holding accessory being flush with the durable shell member;
a hanging accessory secured by a magnet to said metal piece in said recess in said durable shell; and
a standing accessory having a hinge member secured to said hinge member in said lower accessory opening in said durable shell;
wherein said holding accessory comprises:
a support member having a plurality of openings, said support member overlapping a first side of said lip in said durable shell member;
first and second stay members, each said stay member having a plurality of snap-in members securing said stay members to said support member, each stay member overlapping a portion of a second side of said lip in said durable shell member;
first and second clips each slidingly connected to said support member; and
an elastic band secured between said first and second clips.

2. A mobile device accessory assembly according to claim 1, wherein said lower accessory opening is at an edge of said durable shell.

3. A mobile device accessory assembly according to claim 2, wherein said standing accessory has an open position and a closed position, wherein when said standing accessory is in said closed position said standing accessory is flush with said durable shell.

4. A mobile device accessory assembly comprising:
a case comprising:
a durable shell member having a shape to accommodate a mobile device, said durable shell having a front face, a rear face, a circular accessory opening with a lip around a portion of the circumference of the circular accessory opening, wherein said lip is recessed from said front face and said rear face; and
a holding accessory rotatably secured over said lip in said circular accessory opening in said durable shell, said holding accessory being flush with said front face and said rear face of the durable shell member, wherein said holding accessory comprises:
a support member having a plurality of holes, said support member overlapping a first side of said lip in said durable shell member, said support member being flush with said front face of the durable shell member; and
first and second stay members, each said stay member having a plurality of snap-in members securing said stay members to said support member, each stay member overlapping a portion of a second side of said lip in said durable shell member, said first and second stay members being flush with said rear face of said durable shell member.

5. A mobile device accessory assembly comprising:
a case comprising:
a durable shell member having a shape to accommodate a mobile device, said durable shell having a front face, a rear face, a circular accessory opening with a lip around a portion of the circumference of the circular accessory opening, wherein said lip is recessed from said front face and said rear face; and
a holding accessory rotatably secured over said lip in said circular accessory opening in said durable shell, said holding accessory comprising:
a support member having a plurality of holes, said support member overlapping a first side of said lip in said durable shell member, said support member being flush with said front face of the durable shell member; and
first and second stay members, each said stay member having a plurality of snap-in members securing said stay members to said support member, each stay member overlapping a portion of a second side of said lip in said durable shell member, said first and second stay members being flush with said rear face of said durable shell member;
a first clip connected to said support member;
a second clip slidingly connected to said support member; and
an elastic band secured between said first and second clips;
wherein, with said first clip in a first position a first distance from said second clip said elastic band is flat against said support member and with said first clip in a second position a second distance from said second clip said elastic band protrudes away from said support member.

6. A mobile device accessory assembly according to claim 4, wherein said durable shell member has a recess.

7. A mobile device accessory assembly according to claim 6, further comprising a metal piece secured in said recess.

8. A mobile device accessory assembly according to claim 7, wherein said metal piece is secured in said recess with glue.

9. A mobile device accessory assembly according to claim 8, further comprising:
a hanging accessory assembly secured to said case at said metal piece in said recess in said durable shell.

10. A mobile device accessory assembly according to claim 7, wherein said hanging accessory assembly comprises:
a main body member comprising:
a magnet support section having a recess with a magnet secured in said recess, said magnet securing said hanging support accessory assembly to said metal piece in said recess in said durable shell;
a first curved section extending from said magnet support section;
a second curved section extending from said first curved section;
a suction cup support section extending from said second curved section;
a post extending from said suction cup support section; and
a ball joint;
a rotator cup member having a pair of posts and a cupped section receiving said ball joint;
a suction lever connected to said pair of posts on said rotator cup member;
a suction cup shape keeper; and
a suction cup connected to said rotator cup member;
wherein said first curved section and said second curved section in said main body member provide for said case connected to said hanging assembly to hang substantially directly below said ball joint.

11. A mobile device accessory assembly according to claim 10, wherein said magnet comprises a polymagnet.

12. A mobile device accessory assembly according to claim 10, wherein said magnet is secured in said recess in said magnet support section with an adhesive.

13. A mobile device accessory assembly according to claim 4, wherein said durable shell member has a second accessory opening at an edge of said durable shell member, wherein said second accessory opening has two sides extending perpendicular from said edge and a third side parallel to and space apart from said edge and said third side has a hinge member.

14. A mobile device accessory assembly according to claim 13, further comprising:
a standing accessory having a hinge member secured to said hinge member in said lower accessory opening in said durable shell.

* * * * *